United States Patent
Nedorezov et al.

(10) Patent No.: US 8,882,635 B2
(45) Date of Patent: Nov. 11, 2014

(54) CONTROLLING AN AUTOMATIC VEHICLE RESTART ON A HILL

(75) Inventors: Felix Nedorezov, Rochester Hills, MI (US); Hong Jiang, Canton, MI (US); Davor D. Hrovat, Ann Arbor, MI (US); Steven G. Thomas, Bloomfield Hills, MI (US); Alex O. Gibson, Ann Arbor, MI (US); Roger L. Huffmaster, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 749 days.

(21) Appl. No.: 13/155,659

(22) Filed: Jun. 8, 2011

(65) Prior Publication Data

US 2012/0316029 A1 Dec. 13, 2012

(51) Int. Cl.
*B60W 10/115* (2012.01)
*B60W 30/18* (2012.01)
*B60W 10/06* (2006.01)
*F16H 61/00* (2006.01)

(52) U.S. Cl.
CPC ......... *B60W 30/18118* (2013.01); *B60W 10/06* (2013.01); *B60W 10/115* (2013.01); *F16H 61/0059* (2013.01); *B60Y 2400/427* (2013.01)
USPC .................................. 477/34; 477/3; 477/97

(58) Field of Classification Search
USPC ................................................ 477/3, 34, 97
See application file for complete search history.

(56) References Cited

U.S. PATENT DOCUMENTS

| | | | |
|---|---|---|---|
| 1,835,756 A | 12/1931 | Buchanan | |
| 2,021,508 A | 11/1935 | Harrison et al. | |
| 2,037,198 A | 4/1936 | Moody | |
| 2,050,759 A | 8/1936 | Lyons | |
| 2,507,306 A | 5/1950 | Jameson | |
| 2,613,774 A | 10/1952 | Neracher | |
| 4,799,395 A | 1/1989 | Janiszewski | |
| 4,811,655 A | 3/1989 | Janiszewski | |
| 4,858,498 A * | 8/1989 | Bouda | 477/137 |
| 5,474,164 A | 12/1995 | Berger | |
| 6,679,367 B2 | 1/2004 | Baker et al. | |
| 6,899,212 B2 | 5/2005 | Li | |
| 7,051,859 B2 * | 5/2006 | Yurgil et al. | 192/219.2 |
| 7,136,735 B2 | 11/2006 | Carlson et al. | |

FOREIGN PATENT DOCUMENTS

| | | |
|---|---|---|
| EP | 1350663 A1 | 10/2003 |
| JP | 2006017229 A | 1/2006 |
| JP | 2008144809 A | 6/2008 |

* cited by examiner

*Primary Examiner* — Derek D Knight
(74) *Attorney, Agent, or Firm* — James Dottavio; MacMillan, Sobanski & Todd, LLC

(57) ABSTRACT

A method for controlling a vehicle on an uphill incline includes automatically shifting a transmission to first gear, automatically stopping the engine, using wheel torque to maintain a one-way clutch engaged and to hold a transmission component against rotation, preventing vehicle rollback by automatically engaging a target gear and tying-up the transmission automatically restarting the engine, and automatically reengaging first gear.

22 Claims, 3 Drawing Sheets

| CLUTCH ELEMENT APPLICATION CHART | | | | | | |
|---|---|---|---|---|---|---|
| | CLT 60 | CLT 62 | BRK 64 | BRK 66 | BRK 68 | OWC 70 |
| 1st | | | | (B) | X | X |
| 2nd | | | X | | X | O/R |
| 3rd | | X | | | X | O/R |
| 4th | X | | | | X | O/R |
| 5th | X | X | | | | O/R |
| 6th | X | | X | | | O/R |
| Rev | | X | | X | | |

Fig. 2

CONTROLLING AN AUTOMATIC VEHICLE RESTART ON A HILL

BACKGROUND OF THE INVENTION

1. Field of the Invention

This invention relates generally to the control of a vehicle stopped on a hill, particularly to holding the vehicle against unintended rolling.

2. Description of the Prior Art

In micro hybrid vehicles where engine is shut down when the vehicle is stopped it is desirable to prevent the vehicle from rolling backwards when vehicle is on an uphill grade. This is particularly critical when the brake pedal is released but the engine is in the process of starting up and has not developed full torque.

At the same time when the vehicle is stopped on a downhill slope it is not necessary to inhibit vehicle motion since it is common driver expectation to see vehicle rolling on the downgrade road when brakes are released.

In some existing art this is accomplished through a hill hold system in which the wheel brakes are applied. These systems require grade detection, which can be challenging due to various electronic noise factors such as temperature and time drift of the grade sensor signal, and various failure modes when the sensor information is not available to the brake system.

Some brake hill hold systems also require an electric pump to create either hydraulic pressure or vacuum, which maintain excessive brake pressure once the brake pedal is released. This pump depletes the vehicle battery and thus reduces potential fuel economy benefit.

SUMMARY OF THE INVENTION

A method for controlling a vehicle on an uphill incline includes automatically shifting a transmission to first gear, automatically stopping the engine, using wheel torque to maintain a one-way clutch engaged and to hold a transmission component against rotation, preventing vehicle rollback by automatically engaging a target gear and tying-up the transmission automatically while restarting the engine, and automatically reengaging first gear.

No brake intervention is required to maintain hill hold eliminating potential need for the brake vacuum supply or for the electric brake pump.

Also no grade sensor, such as a tilt detection sensor, is required for the execution of the hill hold, thereby reducing the cost of the system and improving reliability.

The control does not require a roll back signal or any additional controller functionality but rather relies on the directional properties of a one-way clutch.

The control is robust and works very well even on very small grades.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 2 is chart showing for each gear the applied and released states of the friction control elements of the transmission of FIG. 1.

DESCRIPTION OF THE PREFERRED EMBODIMENT

Figure 1:
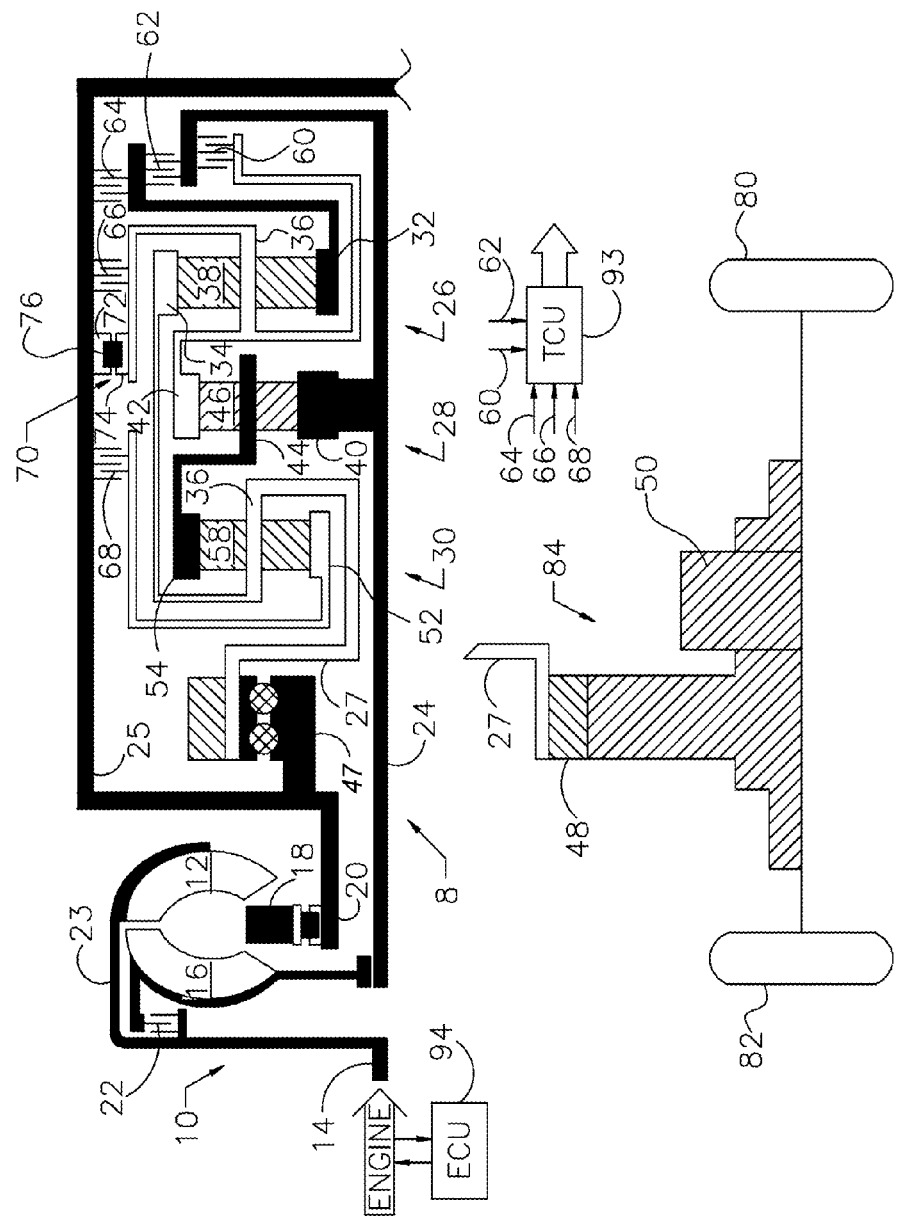
FIG. 1 is a schematic diagram of an automatic transmission.

Referring now to the drawings, there is illustrated in FIG. 1 the kinematic arrangement of an automatic transmission 8. A torque converter 10 includes an impeller wheel 12 connected to the crankshaft 14 of an internal combustion engine, a bladed turbine wheel 16, and a bladed stator wheel 18. The impeller, stator and turbine wheels define a toroidal fluid flow circuit, whereby the impeller 12 is hydrokinetically connected to the turbine 16. The stator 18 is supported rotatably on a stationary stator shaft, and an overrunning brake 20 anchors the stator to the shaft to prevent rotation of the stator in a direction opposite the direction of rotation of the impeller, although free-wheeling motion in the opposite direction is permitted.

The torque converter 10 includes a lockup clutch 22 located within the torque converter impeller housing 23. When clutch 22 is engaged, the turbine 16 and impeller 12 are mechanically connected to a transmission input shaft 24; when clutch 22 is disengaged, the turbine 16 and impeller 12 are hydrokinetically connected and mechanically disconnected. Fluid contained in the torque converter 10 is supplied from the output of an oil pump assembly and is returned to an oil sump, to which an inlet of the pump is connected hydraulically.

Transmission 8 is enclosed in a transmission housing 25, which is fixed against rotation to the vehicle structure. The input 24 is driven by the engine through torque converter 10. An output 27 is driveably connected to the vehicle's wheels, preferably through a differential mechanism and a set of transfer gears (not shown).

The transmission 8 includes three epicyclic gearsets 26, 28, 30. The first gearset 26 includes a first sun gear 32, first ring gear 34, first carrier 36, and a first set of planet pinions 38, supported for rotation on carrier 36 and meshing with first sun gear 32 and first ring gear 34. Ring gear 34 is secured to carrier 36 and output 27.

The second gearset 28 includes a second sun gear 40, second ring gear 42, second carrier 44, and a set of planet pinions 46, supported for rotation on second carrier 44. Sun gear 40 is secured to input 24. The output 27 is supported on bearings 47 and secured to a final drive pinion 48, which transmits torque to the ring gear (not shown) of a differential mechanism 50. Each of the vehicle wheels 80, 82 is driveably connected to an output of the differential mechanism 50.

The third gearset 30 includes a sun gear 52, ring gear 54, carrier 56, and a first set of planet pinions 58, supported for rotation on carrier 56 and meshing with sun gear 52 and ring gear 54.

Transmission 8 includes two hydraulically actuated clutches 60, 62 and three hydraulically actuated brakes 64, 66, 68. The hydraulically actuated clutches and brakes are sometimes referred to as friction elements or control elements. A clutch 60 selectively opens and closes a drive connection between input 24 to carrier 36 and ring gear 42. A clutch 62 selectively opens and closes a drive connection between sun gear 32 and input 26. A brake 64 alternately releases and holds sun gear 32 against rotation. A brake 66 alternately releases and holds carrier 36 and ring gear 42 against rotation. A brake 68 alternately releases and holds sun gear 52 against rotation.

Clutches 60, 62 and brakes 64, 66, 68 include plates, which are connected by a spline to a first member, and friction discs, which are connected by a spline to a second member, the plates and discs being interleaved. When hydraulic pressure is applied to a servo that actuates a control element, its plates and discs are forced together into mutual frictional contact, thereby increasing the torque transmitting capacity of the control element and driveably connecting the first and second members. When hydraulic pressure is vented from the servo, the control element transmits no torque, allowing the first and second members to rotate independently.

Although clutches 60, 62 and brakes 64, 66, 68 have been illustrated and described as hydraulically actuated multi-plate clutches and brakes, the invention may be practiced with alternate types of releasable connections including but not limited to dog clutches and brakes, controllable one way clutches and brakes, magnetically actuated clutches and brakes, or electrically actuated clutches and brakes.

A mechanical one-way clutch (OWC) 70 includes an outer race 72, secured to the housing 25; an inner race 74, secured to carrier 36; and an element 76 that alternately engages the races 72, 74 and produces a drive connection between the races in one rotary direction. OWC 70 overruns or disengages, thereby releasing the inner race 74 for free rotation in the opposite direction. In this way, OWC 70 holds sun gear 42 and carrier 36 against rotation in one rotary direction and releases them to rotate freely in the opposite rotary direction. OWC 70 is arranged in parallel with brake 66 between carrier 36 and housing 25.

As the table of FIG. 2 shows, first gear is produced by engaging brake 68. OWC 70 is engaged. When brake 66 is engaged, first gear has engine braking; when brake 66 is disengaged, first gear does not have the engine braking.

Second gear is produced by concurrently engaging brakes 64 and 68. OWC 70 overruns in each of the forward gears other than first gear. Third gear is produced by concurrently engaging brake 68 and clutch 62. Fourth gear is produced by concurrently engaging brake 68 and clutch 60. Fifth gear is produced by engaging clutches 60 and 62. Sixth gear is produced by concurrently engaging brake 64 and clutch 60. Reverse gear is produced by concurrently engaging brake 66 and clutch 62.

Figure 3:
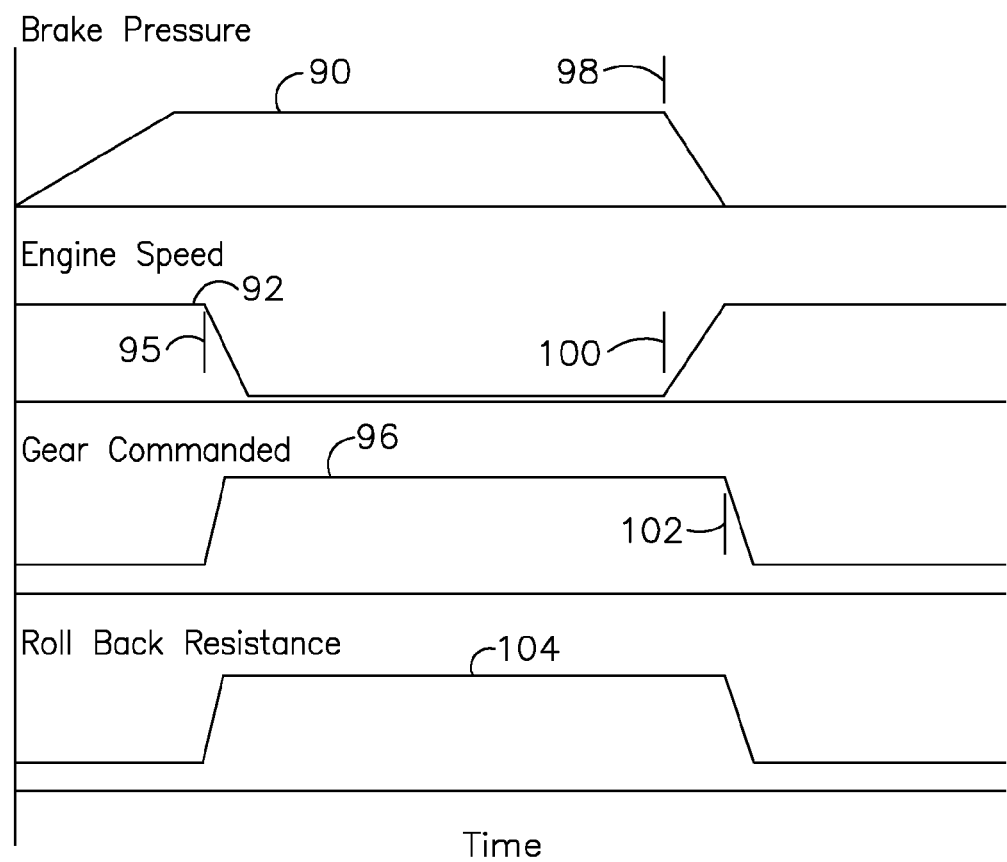
FIG. 3 is a graph show the variation of various vehicle parameters as the control is performed.

When the vehicle is stopped in first gear on a hill having positive slope, negative wheel torque produced by the weight of the vehicle is transmitted from wheels 80, 82 through the final drive mechanism 84 and transmission gearing, toward the input 24 and engine. FIG. 3 shows wheel brake pressure 90 increasing as the brake pedal is applied and engine speed 92 decreasing when the engine is turned off automatically by an electronic engine control unit (ECU) 94 at 95. This wheel torque locks OWC 70, causing it to produce a drive connection between carrier 36 and housing 25 and a torsion reaction to the negative wheel torque.

If under these conditions, transmission 8 shifts from the current gear, first gear, to another gear, the target gear, while the vehicle is stopped in first gear with the engine off on a hill having positive slope, as might occur in response to commands from an electronic transmission control unit (TCU) 93, the state of engagement of clutches 60, 62 and brakes 64, 66, 68 corresponding to the target gear and the locked OWC 70 will cause transmission 8 to tie-up and will stop the vehicle from rolling backwards on the uphill incline.

Under these conditions, FIG. 3 shows an upshift at 96 to third gear, in which clutch 62 and brake 68 are engaged, OWC remains engage and brake 66 becomes disengaged. Due to the concurrent engagement of OWC 70, clutch 62 and brake 68, transmission 8 becomes tied-up, thereby preventing the vehicle from rolling backward down the hill.

Because of the directional properties of OWC 70, the transmission is not tied-up when the vehicle is stopped on a hill with negative slope. Instead the positive wheel torque produced by the weight of the vehicle unlocks OWC 70.

FIG. 3 shows that the vehicle operator having released the wheel brakes at 98, and the engine having been restarted automatically at 100 by the ECU 94. At 102, the transmission is shifted into first gear, thereby engaging brakes 66 and 68. Engine torque propels the vehicle forward preventing rollback 104 on the uphill grade.

In accordance with the provisions of the patent statutes, the preferred embodiment has been described. However, it should be noted that the alternate embodiments can be practiced otherwise than as specifically illustrated and described.

The invention claimed is:

1. A method for controlling a vehicle rollback on an uphill incline while allowing roll forward on a downhill incline, comprising:
   (a) automatically shifting a transmission to first gear;
   (b) automatically stopping an engine;
   (c) on an uphill incline, using wheel torque to maintain a one-way clutch engaged to hold a transmission component against rotation;
   (d) preventing vehicle rollback by automatically engaging a target gear and tying-up the transmission, while allowing roll forward;
   (e) restarting the engine;
   (f) automatically reengaging first gear.

2. The method of claim 1, wherein steps (a), (d) and (f) further include using an electronic transmission control unit to shift into first gear and to shift to another gear automatically.

3. The method of claim 1, wherein step (d) further includes the target gear being one of second through sixth gears.

4. The method of claim 1, wherein step (c) further includes developing wheel torque using a weight of the vehicle and a slope of the uphill.

5. The method of claim 1, wherein step (c) further includes maintaining the one-way clutch engaged such that the one-way clutch holds said component against rotation, and said component is not held against rotation in the target gear.

6. The method of claim 1, wherein step (e) is performed before step (f).

7. The method of claim 1, wherein:
   step (b) is performed after a wheel brake pressure is increased; and
   step (e) is performed after the wheel brake pressure is reduced.

8. A method for controlling a vehicle rollback on an uphill incline while allowing roll forward on a downhill incline, comprising:
   (a) automatically shifting a transmission to a current gear;
   (b) automatically stopping an engine;
   (c) on an uphill incline, using wheel torque to maintain a one-way clutch engaged to hold a transmission component against rotation;
   (d) preventing vehicle rollback by automatically engaging a target gear that is one of second through sixth gears and tying-up the transmission;
   (e) automatically restarting the engine;
   (f) automatically reengaging the current gear.

9. The method of claim 8, wherein steps (a), (d) and (f) further include using an electronic transmission control unit to shift into the current gear and to shift to a target gear automatically.

10. The method of claim 8, wherein steps (b) and (e) further include using an electronic engine control unit to stop and to restart the engine automatically.

11. The method of claim 8, wherein step (c) further includes developing wheel torque using a weight of the vehicle and a slope of the uphill.

12. The method of claim 8, wherein step (c) further includes maintaining the one-way clutch engaged such that the one-way clutch holds said component against rotation, and said component is not held against rotation in the target gear.

13. The method of claim 8, wherein step (e) is performed before step (f).

14. The method of claim 8, wherein:
   step (b) is performed after a wheel brake pressure is increased; and
   step (e) is performed after the wheel brake pressure is reduced.

15. A method for controlling a vehicle rollback on an uphill incline while allowing roll forward on a downhill incline, comprising:
   (a) automatically shifting a transmission to first gear;
   (b) automatically stopping an engine;
   (c) on an uphill incline, using wheel torque to maintain a one-way clutch engaged to hold a planet carrier against rotation;
   (d) preventing vehicle rollback by automatically engaging a target forward gear higher than first gear and tying-up the transmission, while allowing roll forward;
   (e) automatically restarting the engine.
   (f) automatically reengaging first gear.

16. The method of claim 15, wherein steps (a), (d) and (f) further include using an electronic transmission control unit to shift into first gear and to shift to another gear automatically.

17. The method of claim 15, wherein steps (b) and (e) further include using an electronic engine control unit to stop and to restart the engine automatically.

18. The method of claim 15, wherein step (c) further includes developing wheel torque using a weight of the vehicle and a slope of the uphill.

19. The method of claim 15, wherein step (c) further includes maintaining the one-way clutch engaged such that the one-way clutch holds said planet carrier against rotation, and said planet carrier is not held against rotation in the target gear.

20. The method of claim 15, wherein step (e) is performed before step (f).

21. The method of claim 15, wherein:
   step (b) is performed after a wheel brake pressure is increased; and
   step (e) is performed after the wheel brake pressure is reduced.

22. A method for preventing vehicle rollback on an uphill incline while allowing roll forward on a downhill incline, comprising:
   (a) shifting a transmission to first gear;
   (b) stopping an engine;
   (c) on an uphill incline, using wheel torque to maintain a one-way clutch engaged to hold a transmission component against rotation;
   (d) engaging a target forward gear higher than first gear and tying-up the transmission.

* * * * *